(12) United States Patent
Benvenuti et al.

(10) Patent No.: US 7,180,913 B2
(45) Date of Patent: Feb. 20, 2007

(54) TRANSPARENT ERROR COUNT TRANSFER METHOD AND APPARATUS

(75) Inventors: Nicola Benvenuti, Nepean (CA); James R. Mattson, Kanata (CA); Leroy A. Pick, Nepean (CA); Peter W. Phelps, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 1009 days.

(21) Appl. No.: 09/961,297

(22) Filed: Sep. 25, 2001

(65) Prior Publication Data

US 2003/0025960 A1 Feb. 6, 2003

Related U.S. Application Data

(60) Provisional application No. 60/307,372, filed on Jul. 25, 2001.

(51) Int. Cl.
*H04J 3/07* (2006.01)
*G06F 11/00* (2006.01)

(52) U.S. Cl. ............ 370/476; 370/506; 370/514; 714/704

(58) Field of Classification Search ........ 370/358, 370/465, 467–476, 506–514, 535–539, 226–242; 714/703–713
See application file for complete search history.

(56) References Cited

U.S. PATENT DOCUMENTS

| | | | | |
|---|---|---|---|---|
| 5,315,594 A * | 5/1994 | Noser | ................. | 370/353 |
| 5,452,306 A * | 9/1995 | Turudic et al. | ............ | 370/465 |
| 5,555,248 A * | 9/1996 | Sugawara | .............. | 714/704 |
| 5,841,760 A * | 11/1998 | Martin et al. | ............ | 370/242 |
| 5,923,653 A * | 7/1999 | Denton | ................. | 370/375 |
| 6,310,911 B1 * | 10/2001 | Burke et al. | ............ | 375/224 |
| 6,487,686 B1 * | 11/2002 | Yamazaki et al. | ........ | 714/703 |
| 6,580,731 B1 * | 6/2003 | Denton | ................. | 370/539 |
| 6,667,990 B1 * | 12/2003 | Arao | ................... | 370/465 |
| 6,674,771 B1 * | 1/2004 | Taniguchi | .............. | 370/505 |
| 6,826,200 B1 * | 11/2004 | Pick et al. | ............. | 370/535 |
| 6,859,453 B1 * | 2/2005 | Pick et al. | ............. | 370/358 |
| 6,885,632 B1 * | 4/2005 | Mattson | ............... | 370/216 |
| 6,892,336 B1 * | 5/2005 | Giorgetta et al. | ........ | 714/704 |

(Continued)

OTHER PUBLICATIONS

Goralski, Walter J., "Sonet: A Guide to Synchronous Optical Network", McGraw-Hill, New York, 1997, pp. 140-152.

*Primary Examiner*—Man U. Phan
(74) *Attorney, Agent, or Firm*—Jeffrey M Measures; Borden Ladner Gervais LLP

(57) ABSTRACT

It is proposed that currently unused portions of transport overhead in frames sent on a high-speed outgoing channel be used to carry error count information from each of four low-speed input channels. At a 4:1 combiner, error monitoring bytes are extracted from transport overhead of frames received on each of the four input channels. Error counts are determined and accumulated for each input channel before being passed to a transport overhead generator for the outgoing channel, where they are inserted as bit patterns in unused portions of the transport overhead. At a receiving demultiplexer, the error counts are extracted from the transport overhead of incoming frames. The extracted error counts are then used to alter the error monitoring bytes included in the transport overhead of frames sent on each of four outgoing channels such that, at the far end of those outgoing channels, a correct number of errors for the three part path may be determined.

5 Claims, 13 Drawing Sheets

U.S. PATENT DOCUMENTS

| | | | |
|---|---|---|---|
| 6,915,348 B1 * | 7/2005 | Roberts | 709/236 |
| 6,934,305 B1 * | 8/2005 | Duschatko et al. | 370/514 |
| 6,983,414 B1 * | 1/2006 | Duschatko et al. | 714/782 |
| 2002/0120902 A1 * | 8/2002 | Brown | 714/776 |
| 2003/0198232 A1 * | 10/2003 | Denton | 370/395.52 |

* cited by examiner

FIG. 3A

| A1 | A2 | J0 |
|---|---|---|
| B1 | E1 | F1 |
| D1 | D2 | D3 |

| H1 | H2 | H3 |
|---|---|---|
| B2 | K1 | K2 |
| D4 | D5 | D6 |
| D7 | D8 | D9 |
| D10 | D11 | D12 |
| S1 | UNDEFINED | E2 |

~300B

| A1 | A2 | Z0 |
|---|---|---|
| UNDEFINED | UNDEFINED | UNDEFINED |
| UNDEFINED | UNDEFINED | UNDEFINED |

400A

| H1 | H2 | H3 |
|---|---|---|
| B2 | UNDEFINED | UNDEFINED |
| UNDEFINED | UNDEFINED | UNDEFINED |
| UNDEFINED | UNDEFINED | UNDEFINED |
| Z1 | Z2 | UNDEFINED |

400B

TRANSPARENT ERROR COUNT TRANSFER METHOD AND APPARATUS

REFERENCE TO RELATED APPLICATION

This application claims the benefit under 35 U.S.C. 119(e) of U.S. provisional application No. 60/307,372 filed Jul. 25, 2001 entitled "Transparent Error Count Transfer Method and Apparatus" the contents of which are incorporated herein.

FIELD OF THE INVENTION

The present invention relates to synchronous optical communication and, in particular, to a transparent error count transfer method and apparatus.

BACKGROUND OF THE INVENTION

Synchronous Optical NETworking (SONET) is an American National Standards Institute (ANSI) standard for synchronous data transmission on optical media. An equivalent international standard to SONET is called synchronous digital hierarchy (SDH). Although the following discussion revolves around SONET, it should be apparent to a person skilled in the art where parallels may be drawn between the two standards.

In a SONET based transmission system, signals are arranged into "Synchronous Transport Signal Level 1 (STS-1)" signals with a basic bit rate of 51.84 Mbps. SONET includes a set of signal rate multiples for transmitting digital signals on optical fiber. The base rate, called Optical Carrier 1 and typically referred to as OC-1, is 51.84 Mbps. An STS-1 signal is carried on a link with an OC-1 signal rate, called an OC-1 link. An OC-2 link runs at twice the base rate (103.68 Mbps) and carries an STS-2 signal. An OC-3 link runs at three times the base rate (155.52 Mbps) and carries an STS-3 signal. Higher rates include OC-12 (622.08 Mbps), OC-48 (2.488 Gbps) and OC-192 (9.95328 Gbps). For simplicity, OC-48 and OC-192 links are often considered to run at 2.5 Gbps and 10 Gbps respectively.

A standard STS-1 frame consists of 6480 bits. The frame is divided into time slots containing 8-bit bundles, called octets or bytes, such that the frame may be seen to be organized in rows of bytes and columns of time slots. For STS-1 specifically, the frame may be considered as nine rows and 90 columns. Not all of an STS-1 frame is payload, as 36 octets (the first three columns) are reserved for "transport overhead" (TOH), which is used for such purposes as frame identification and monitoring of errors. The other 87 columns comprise a synchronous payload capacity. Into the capacity is mapped an 87 column synchronous payload envelope (SPE). Typically, the SPE consists of one column of path overhead and 86 columns of payload.

The transport overhead is comprised of three rows of "section overhead" and six rows of "line overhead". While formulating an STS-1 frame, a local network element generates the line overhead based on a supplied frame capacity. The line overhead and the frame capacity is then amalgamated and scrambled, for instance, to balance the outgoing signal to ensure that an even distribution of ones and zeros are transmitted. The local network element then generates section overhead based on the scrambled line overhead and frame capacity amalgamation.

In the section overhead, one byte, designated "B1", is used for error monitoring. The first bit of B1 is set such that the total number of ones in the first positions of all octets in the previous STS-1 frame, after scrambling, is always an even number. The second bit of B1 is used in the same way, in respect of the second bit of each octet in the STS-1 frame. The remaining bits follow this pattern.

Additionally, in the line overhead, one byte, designated "B2", is used for error monitoring. Where B1 is set relative to the previous STS-1 frame after scrambling, each bit of B2 is set relative to each correspondingly positioned bit in the amalgamated line overhead and frame capacity of the previous STS-1 frame before scrambling.

Typically, a local network element generates a signal of multiple STS-1 frames and sends the signal to a remote network element on an OC-N link. The remote network element receives the signal and extracts information from the transport overhead. A new transport overhead is generated for the signal before the signal is sent on to a third network element. In particular, with respect to error monitoring bytes B1 and B2, the same computing procedures used to create B1 and B2 are performed on a given received STS-1 frame. The results are compared to a B1 and B2 extracted from the STS-1 frame following the given received STS-1 frame. A count of the number of discrepancies is reported by the remote network element to a network management system. The count for B1 indicates the number of differences between a received B1 and a calculated B1. This process of computing, comparing and reporting is called terminating.

Many other bytes are present in the line overhead, including S1, Z1, H1 and H2. S1 is defined in the SONET standard as: Synchronization Status (S1)—The S1 byte is located in the first STS-1 frame of an STS-N frame, and bits 5 through 8 of that byte are allocated to convey the synchronization status of the network element through a Synchronization Status Message (SSM). This SSM is a four-bit code used to indicate synchronization status. Bits 1 through 4 of the S1 byte are currently undefined. The Z1 byte is called a growth byte and takes the same position in the line overhead as the S1 byte, but only in the STS-1 frames other than the first STS-1 frame of an STS-N frame. The H1 and H2 bytes are called pointer bytes and provide an indication of the offset between the pointer bytes and the beginning of the SPE. Synchronization Status Message Definitions are presented in Table 1.

TABLE 1

Synchronization Status Message Definitions

| Description | Acronym | Quality Level | S1 bits 5678 |
|---|---|---|---|
| Stratum 1 Traceable | PRS | 1 | 0001 |
| Synchronized - Traceability Unknown | STU | 2 | 0000 |
| Stratum 2 Traceable | ST2 | 3 | 0111 |
| Transit Node Clock Traceable | TNC | 4 | 0100 |
| Stratum 3E Traceable | ST3E | 5 | 1101 |
| Stratum 3 Traceable | ST3 | 6 | 1010 |
| SONET Minimum Clock Traceable | SMC | 7 | 1100 |
| Stratum 4 Traceable | ST4 | 8 | N/A |
| DON'T USE for Synchronization | DUS | 9 | 1111 |
| Provisionable by the Network Operator | PNO | user assignable | |

Where several separate low-speed SONET signals are to be sent in one high-speed SONET signal, there is a need for a combiner. A combiner serves the purpose, at a sending end, of arranging data from a number of signals into a single, complex signal. At the receiving end, the single signal is divided out into the separate signals by a demultiplexer.

Many STS-1 frames may be multiplexed (combined) into a single STS-N frame. In the STS-N frame, many of the transport overhead bytes only have meaning in the first STS-1 frame. The section overhead (including byte B1) of the first STS-1 frame in an STS-N frame is used to carry information about the entire STS-N frame. However, the line overhead (including byte B2) of each STS-1 frame in the STS-N frame is maintained. A maximum B1 count that may be reported at the receiving end of an exemplary OC-48 link is eight (per STS-48 frame). However, at the receiving end of the same link, the maximum B2 count is 384, which is eight per STS-1 frame for 48 frames.

In an exemplary 4:1 SONET multiplexing application, four STS-48 signals (on OC-48 links) are combined to give one STS-192 signal (on an OC-192 link). The combiner terminates the B1 and B2 bytes of the input STS-48 signals. Since B1 and B2 are terminated at the STS-48 signal input, numbers of errors in each OC-48 link are determined and reported to the network management system by the combiner. At the remote end of the OC-192 link, the four STS-48 signals may be extracted from the received STS-192 signal by a demultiplexer and sent, individually, to four intended remote network elements at the ends of four separate OC-48 links.

When the B1 and B2 bytes are terminated at the remote network elements, the error information represented by the resultant counts will only reflect errors on the OC-48 link from the demultiplexer to the remote network element. Furthermore, the S1 byte in each STS-48 frame will hold an SSM code relating to the synchronization status of the demultiplexer.

An STS-48 frame in the above example traverses three links, namely two OC-48 links and an OC-192 link. It is desirable that the multiplexing process be transparent to the remote network element, i.e., that the three links are considered as a single OC-48 link. However, error information regarding the first OC-48 link and synchronization status of the local network element are typically unavailable to the remote network element.

SUMMARY OF THE INVENTION

By including accumulations of terminated error monitoring counts in unused bytes of transport overhead of an outgoing high-speed data frame, a combiner may transfer error counts associated with separate incoming channels to remote network elements transparently. Advantageously, the error counts transfer mechanism does not affect transparency of any other transport overhead bytes.

In accordance with an aspect of the present invention there is provided a method of generating transport overhead for a high-speed frame of data in a synchronous optical communications network, the high-speed frame of data including a plurality of low-speed frames of data. The method includes receiving at least one indication of error count associated with one of the low-speed frames of data, determining an error count bit pattern representative of the at least one indication of error count and inserting the error count bit pattern into a transport overhead for the high-speed frame, where the error count bit pattern is inserted in at least one portion of the transport overhead and where the at least one portion is unused according to a standard that defines the high-speed frame. In another aspect of the present invention, there is provided a device for generating transport overhead for performing this method.

In accordance with another aspect of the present invention there is provided a method of processing transport overhead for a frame of data in a synchronous optical communications network. The method includes generating an error count by receiving a first low-speed frame, calculating a first error monitoring set of bits based on the first frame, receiving a second low-speed frame, extracting a second error monitoring set of bits from a transport overhead of the second frame, enumerating a number of differences between the first error monitoring set of bits and the second error monitoring set of bits as the error count and where a first performance of the generating gives an initial error count, repeating the generating to give at least one subsequent error count, summing the initial error count and the at least one subsequent error count to give an accumulated error count and sending an indication of error count, based on the accumulated error count, to a device for generating transport overhead for a high-speed frame of data in a synchronous optical communications network, the high-speed frame of data including a plurality of low-speed frames of data including the first low-speed frame and the second low-speed frame. In another aspect of the present invention, there is provided a device for processing transport overhead for performing this method.

In accordance with a further aspect of the present invention there is provided a method of combining a plurality of low-speed frames of data into a high-speed frame of data such that error monitoring counts are transparently transferred to a receiving network element. The method includes receiving a set of low-speed frames on each of a plurality of channels, generating an accumulated error count for each channel from a received set of the plurality of low-speed frames on each channel, determining an error count bit pattern for each channel based on the accumulated error count for each channel and inserting the error count bit pattern into a transport overhead for the high-speed frame, where the one the error count bit pattern is inserted in at least one portion of the transport overhead and where the at least one portion is unused according to a standard that defines the high-speed frame. In another aspect of the present invention, there is provided a combiner for performing this method.

In accordance with a still further aspect of the present invention there is provided a method of processing transport overhead for a frame of data in a synchronous optical communications network. The method includes receiving the frame of data, extracting, from a transport overhead of the frame of data, an error count bit pattern, where the error count bit pattern is extracted from at least one portion of the transport overhead and where the at least one portion is unused according to a standard that defines the frame, determining an error count quantity from the error count bit pattern and indicating the error count quantity to an appropriate one of a plurality of transport overhead generators. In another aspect of the present invention, there is provided a device for processing transport overhead for performing this method.

In accordance with an even further aspect of the present invention there is provided a method of generating transport overhead for a low-speed frame of data in a synchronous optical communications network, the low-speed frame of data received as part of a high-speed frame of data. The method includes receiving at least one error count quantity associated with the low-speed frame of data, where the at least one error count quantity is determined from an error count bit pattern extracted from the high-speed frame of data, determining a standard error monitoring set of bits based on a previous low-speed frame of data, creating an altered error monitoring set of bits that differs from the standard error monitoring set of bits in a number of bit positions equivalent to the error count quantity and inserting the altered error monitoring set of bits into a transport overhead for the frame, where the altered error monitoring set of bits is inserted in a location normally occupied by the error monitoring set of bits according to a standard that defines the frame. In another aspect of the present invention, there is provided a device for generating transport overhead for performing this method.

In accordance with an even further aspect of the present invention there is provided a method of de-multiplexing a plurality of low-speed frames of data from a high-speed frame of data. The method receiving the high-speed frame, extracting an error count bit pattern from the high-speed frame, determining an error count quantity based on the error count bit pattern, determining a standard error monitoring set of bits for a low-speed frame, creating an altered error monitoring set of bits that differs from the standard error monitoring set of bits in a number of bit positions equivalent to the error count quantity and inserting the altered error monitoring set of bits into a transport overhead for the low-speed frame, where the altered error monitoring set of bits is inserted in a location normally occupied by the standard error monitoring set of bits according to a standard that defines the low-speed frame. In another aspect of the present invention, there is provided a device for de-multiplexing for performing this method.

In accordance with a still further aspect of the present invention there is provided a communication system for transporting a plurality of channels of low-speed frames of data on a single channel of high-speed frames of data. The system includes a combiner for combining the low-speed frames of data into a high-speed frame of data including, for each of a plurality of channels, a low-speed transport overhead processor for receiving a set of low-speed frames and generating an accumulated error count from the received set and a high-speed transport overhead generator, in communication with each low-speed transport overhead processor for determining an error count bit pattern for each channel based on the accumulated error count for each channel and inserting at least one the error count bit pattern into a transport overhead for the high-speed frame, where the one the error count bit pattern is inserted in at least one portion of the transport overhead and where the at least one portion is unused according to a standard that defines the high-speed frame. The system further includes a device for de-multiplexing the plurality of low-speed frames of data from the high-speed frame of data including a high-speed transport overhead processor for receiving the high-speed frame, extracting the error count bit pattern from the high-speed frame, determining an error count quantity based on the error count bit pattern, a low-speed transport overhead generator, in communication with the high-speed transport overhead processor, for determining a standard error monitoring set of bits for a low-speed frame, creating an altered error monitoring set of bits that differs from the standard error monitoring set of bits in a number of bit positions equivalent to the error count quantity and inserting the altered error monitoring set of bits into a transport overhead for the low-speed frame, where the altered error monitoring set of bits is inserted in a location normally occupied by the standard error monitoring set of bits according to a standard that defines the low-speed frame.

In accordance with a still further aspect of the present invention there is provided a computer data signal embodied in a carrier wave. The computer data signal includes a frame of data including a transport overhead, where the transport overhead includes an error count bit pattern in at least one portion of the transport overhead and where the at least one portion is unused according to a standard that defines the frame.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 3A illustrates the format of the section overhead of the first STS-1 frame in an STS-N frame;

FIG. 3B illustrates the format of the line overhead of the first STS-1 frame in an STS-N frame;

DETAILED DESCRIPTION

Figure 1:
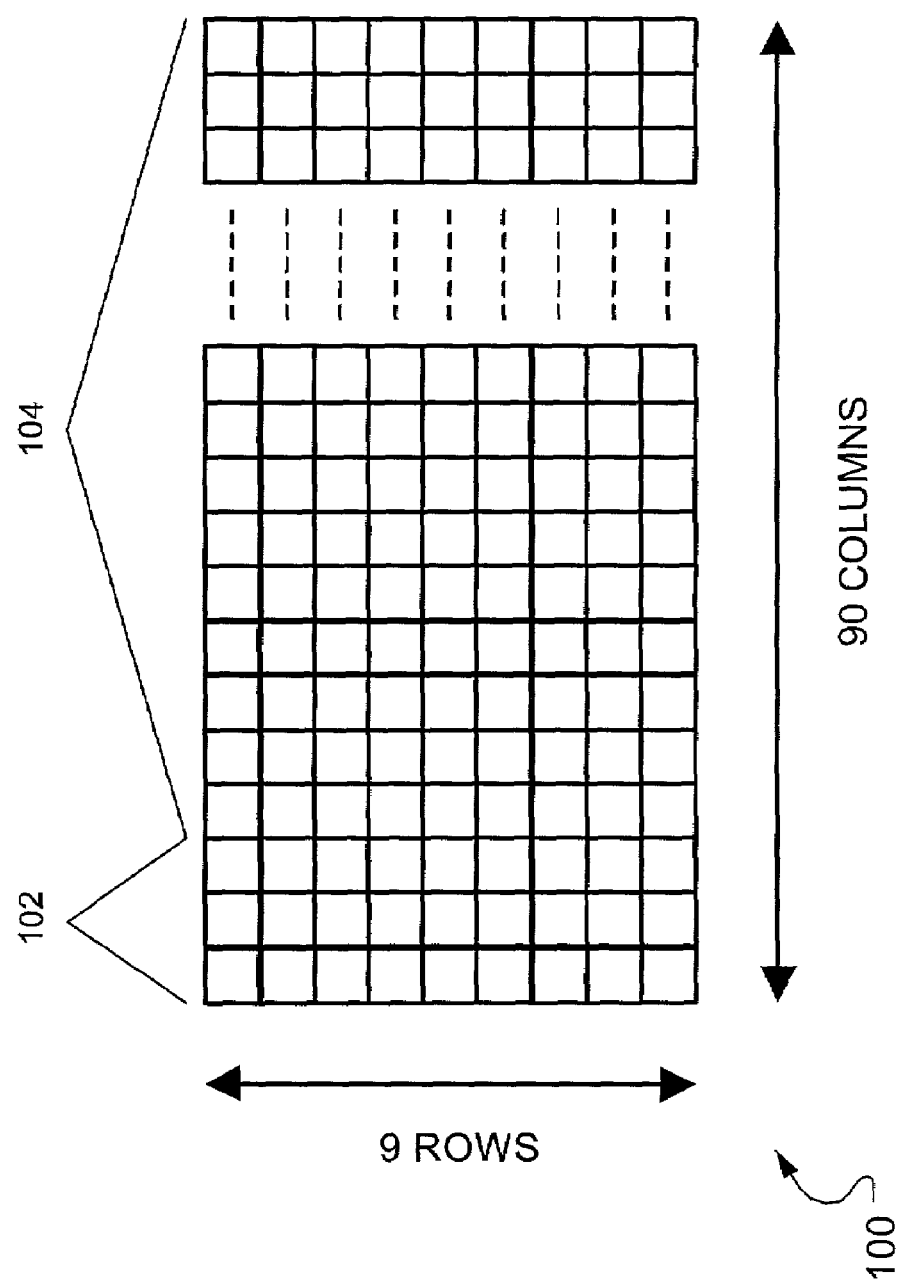
FIG. 1 illustrates the format of a standard STS-1 frame.

FIG. 1 illustrates the format of a standard STS-1 frame 100 as a nine row by 90-column array of bytes. The first three columns 102 contain transport overhead information, while the next 87 columns 104 contain payload information.

Figure 2:
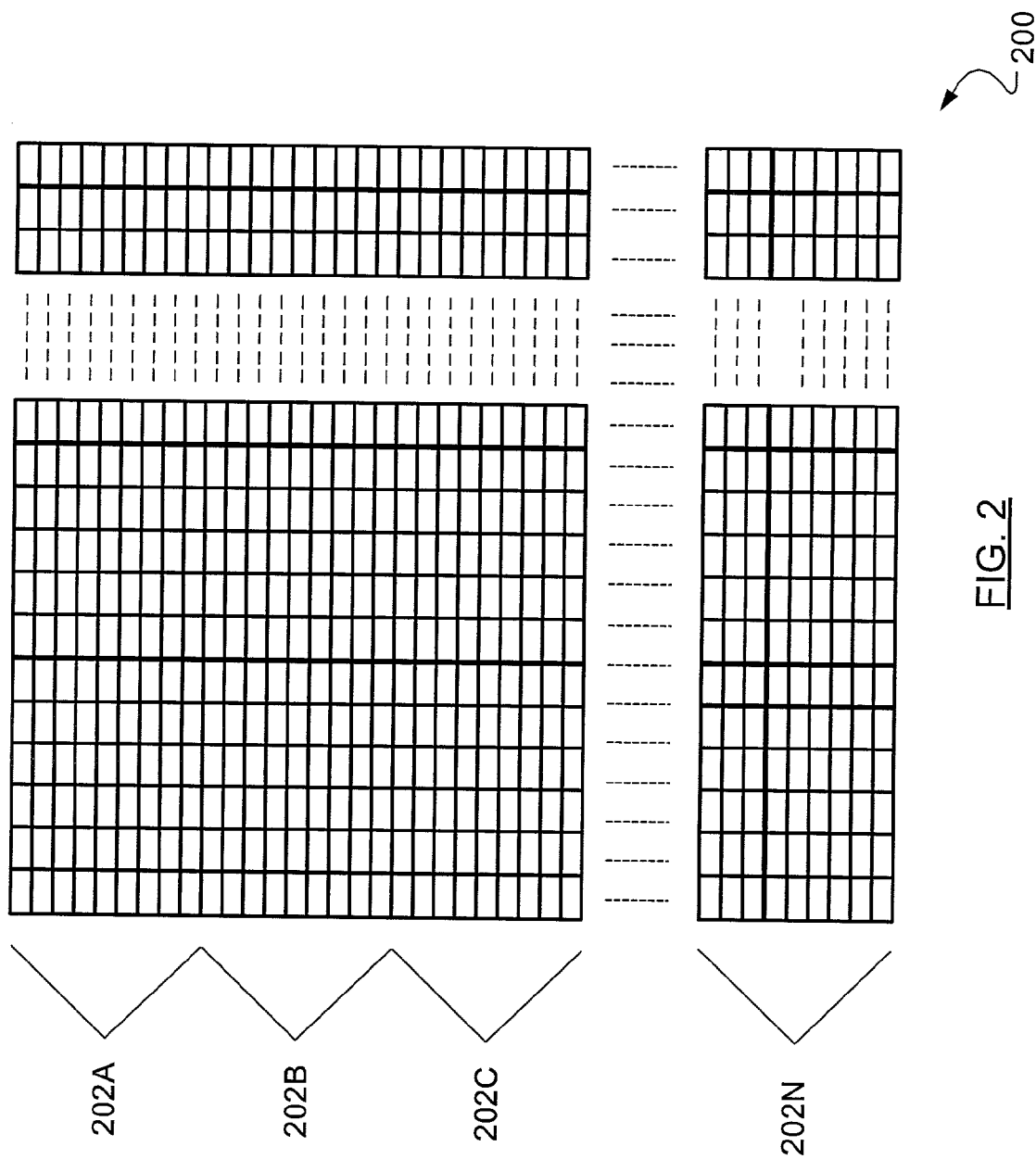
FIG. 2 illustrates the format of a standard STS-N frame.

FIG. 2 illustrates the format of a standard STS-N frame 200 as a composite of N standard STS-1 frames 202A, 202B, 202C, . . . , 202N. According to the SONET standard, when the composite STS-N frame 200 is generated, much of the transport overhead for the entire composite STS-N frame 200 is confined to the 27-byte overhead of the first STS-1 frame 202A.

The 27-byte overhead of the first STS-1 frame 202A is split into section overhead and line overhead and illustrated in FIG. 3A and FIG. 3B respectively. FIG. 3A illustrates a section overhead block 300A with individual bytes identified. Similarly, FIG. 3B illustrates a line overhead block 300B with individual bytes identified.

Figure 4A:
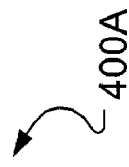
FIG. 4A illustrates the format of the section overhead of an STS-1 frame that is other than the first STS-1 frame in an STS-N frame.
Figure 4B:
FIG. 4B illustrates the format of the line overhead of an STS-1 frame that is other than the first STS-1 frame in an STS-N frame.

The 27-byte overhead of an STS-1 frame, say STS-1 frame 202B, that is other than the first STS-1 frame 202A of the STS-N frame 200, is split into section overhead and line overhead and illustrated in FIG. 4A and FIG. 4B respectively. FIG. 4A illustrates a section overhead block 400A with individual bytes identified. Similarly, FIG. 4B illustrates a line overhead block 400B with individual bytes identified.

Figure 6:
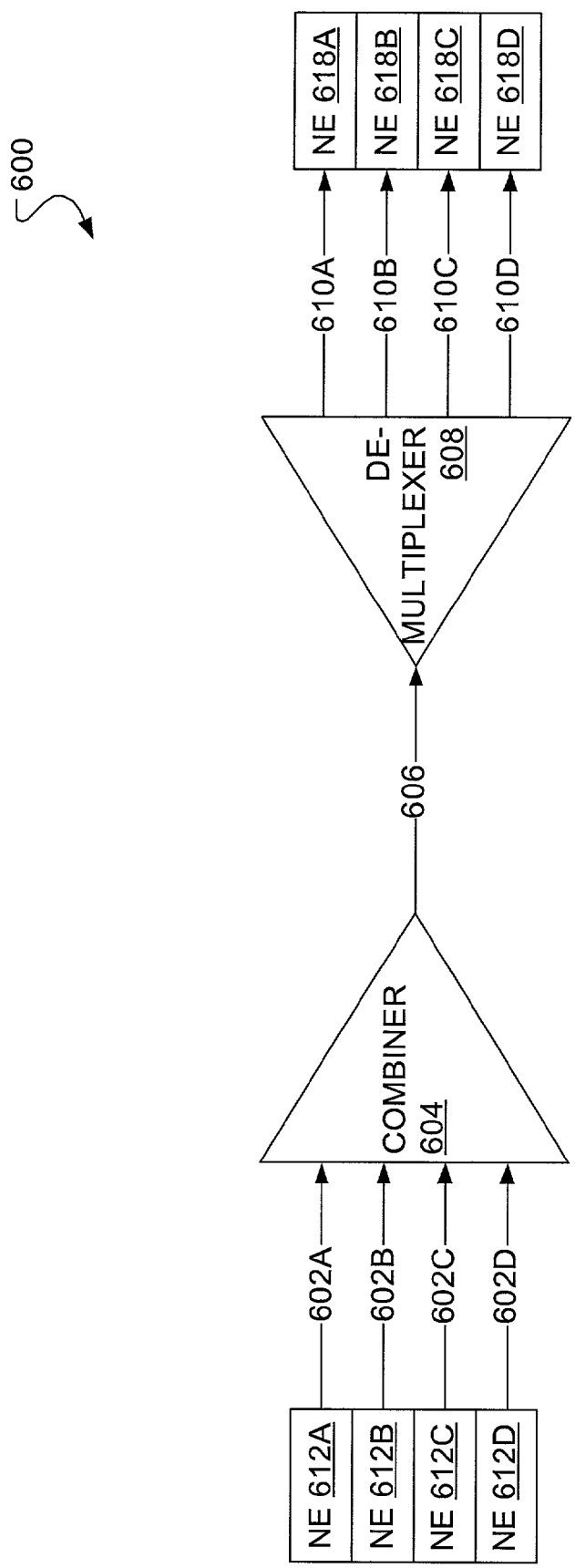
FIG. 6 illustrates a portion of a network in which the present invention may be made of use.

FIG. 6 illustrates a portion 600 of a network including a 4:1 combiner 604 receiving channel A, channel B, channel C and channel D on four input links 602A, 602B, 602C, 602D (individually or collectively referred to as 602) from a local network element A 612A, a local network element B 612B, a local network element C 612C and a local network element D 612D, respectively (these local network elements are hereinafter individually or collectively referred to as 612). The output of the combiner 604 is sent over a transmission link 606 to a 1:4 demultiplexer 608. At the demultiplexer 608, the composite signal received on the transmission link 606 is divided into its four components (channel A, channel B, channel C and channel D), which are output on output links 610A, 610B, 610C, 610D and sent to a remote network element A 612A, a remote network element B 612B, a remote network element C 612C and a remote network element D 612D, respectively.

Figure 7:
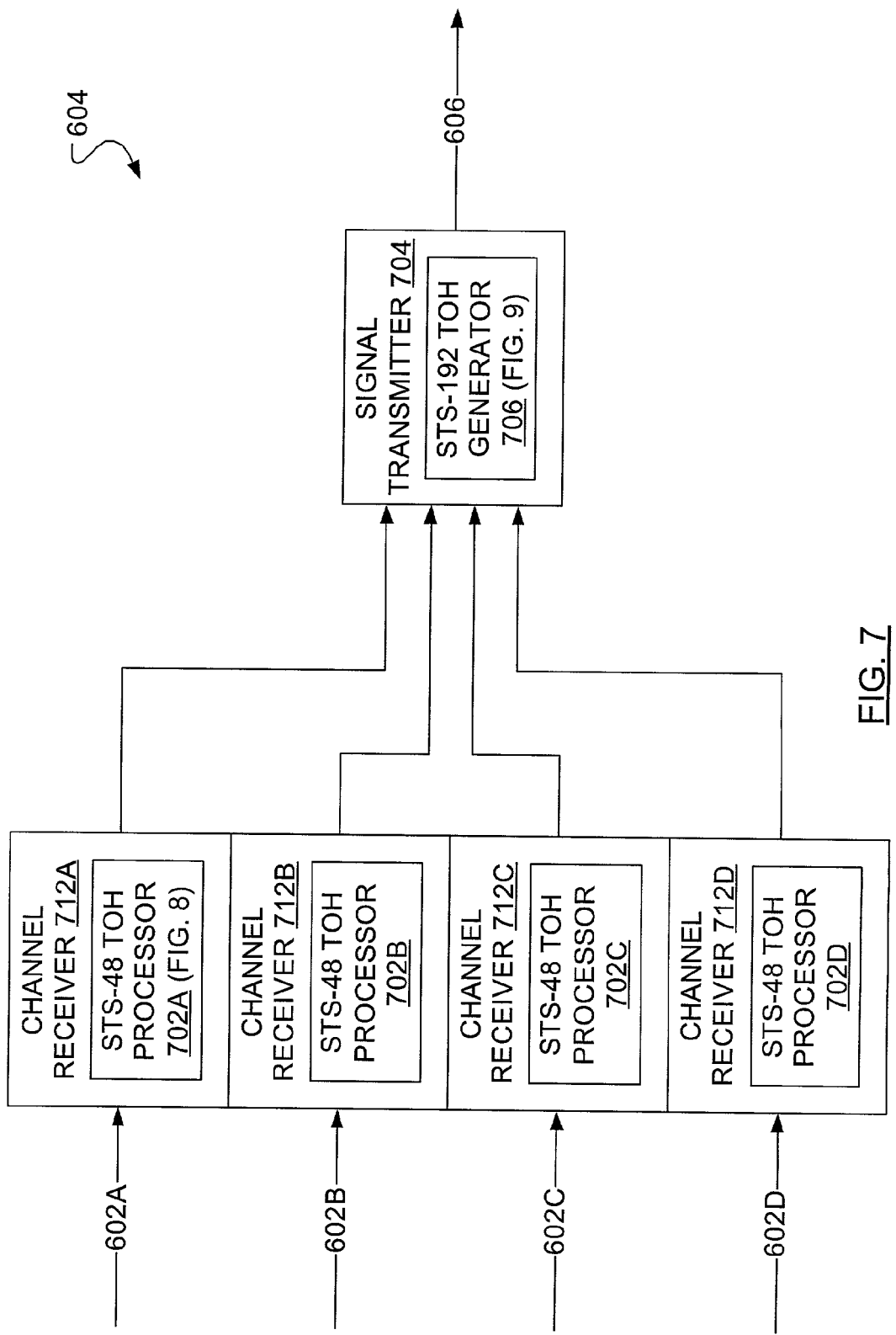
FIG. 7 illustrates a 4:1 combiner for use in the network portion of FIG. 6 in accordance with an aspect of the present invention.

The combiner 604 is reproduced with some additional detail in FIG. 7. In particular, each input link 602A, 602B, 602C, 602D is received by a respective channel receiver 712A, 712B, 712C, 712D (referred to collectively or individually as 712). Each channel receiver 712 includes a respective STS-48 transport overhead processor 702A, 702B, 702C, 702D (individually or collectively referred to as 702). The channel receivers 712 send received STS-48 frames to a signal transmitter 704 along with B1 and B2 counts. The channel receivers 712 send respective received SSM codes to the signal transmitter 704 via software since the SSM codes are not real-time sensitive. The STS-48 frames and B1 and B2 counts are used by an STS-192 transport overhead generator 706 when creating a signal for output on the transmission link 606.

Figure 8:
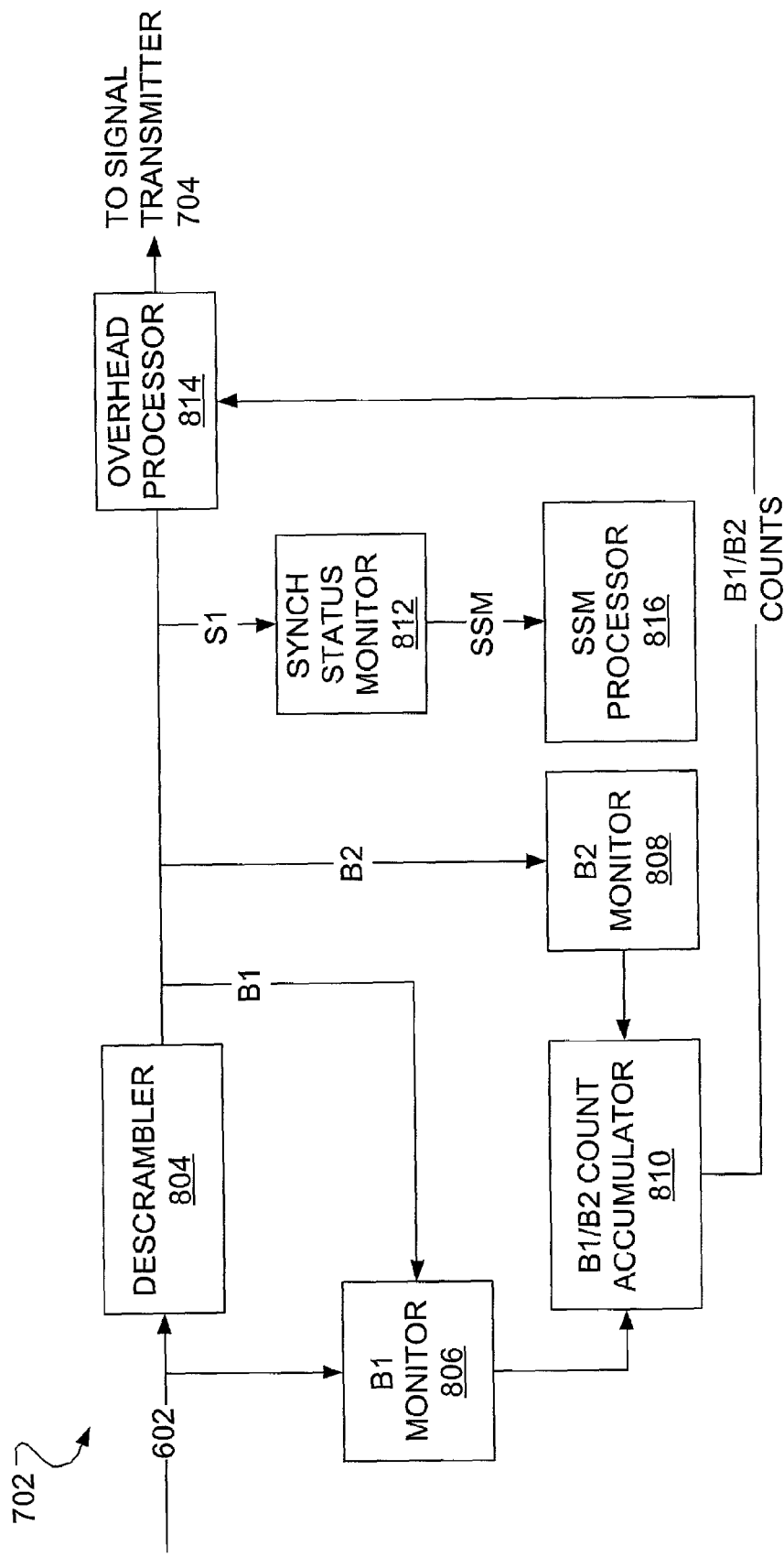
FIG. 8 illustrates a portion of a STS-48 transport overhead processor for use in the 4:1 combiner of FIG. 7 in accordance with an aspect of the present invention.

A generic STS-48 transport overhead processor 702 is illustrated in FIG. 8. A descrambler 804 is included in the TOH processor 702 and receives the STS-48 frames on the appropriate input link 602. The TOH processor 702 includes a B1 monitor 806 that receives frames both before and after descrambling and passes a B1 count to a B1/B2 count accumulator 810. Similarly, a B2 monitor 808 receives frames and passes a B2 count to the accumulator 810. The B1/B2 count accumulator 810 passes accumulated B1/B2 counts to an overhead processor 814. The overhead processor 814 also receives descrambled STS-48 frames from the descrambler 804 and passes the frames to the signal transmitter 704 after having included in the frames the received B1/B2 counts. A suggested manner in which these counts may be included in the frames is presented in FIG. 13. Meanwhile, a synch status monitor 812 extracts S1 bytes from received frames and passes the SSM codes to a SSM processor 816. As will be apparent to a person skilled in the art, several other monitors examine received frames for specific overhead bytes. These other monitors are omitted for clarity.

Figure 9:
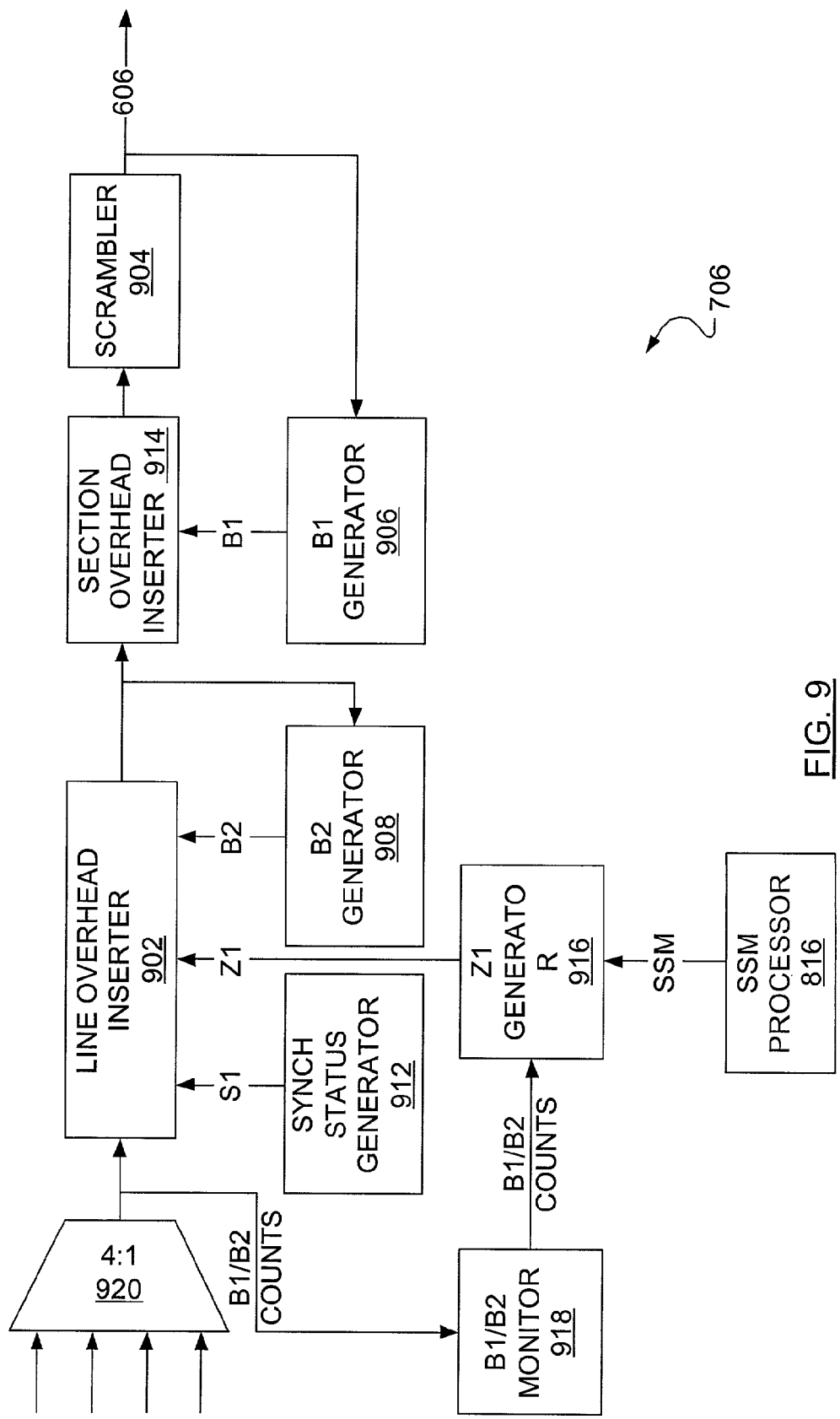
FIG. 9 illustrates a portion of a STS-192 transport overhead generator for use in the 4:1 combiner of FIG. 7 in accordance with an aspect of the present invention.

The STS-192 transport overhead generator 706 is presented in detail in FIG. 9. A 4:1 selector 920 receives input from each of the channel receivers 712 and selects one input at a time to send to a line overhead inserter 902. The line overhead inserter 902 receives input from a synch status generator 912, a B2 generator 908 and a Z1 generator 916. As will be apparent to a person skilled in the art, the line overhead inserter 902 receives input from several other generators of bytes in the line overhead; these other generators are omitted for clarity. As the selector 920 selects input from each of the channel receivers 712, a B1/B2 monitor 918 extracts the channel-specific B1 and B2 counts terminated by the respective TOH processor 702. The Z1 generator 916 receives these counts along with channel specific SSM codes from the SSM processor 816. The Z1 generator 916 then provides channel information to the line overhead inserter 902 in accordance with embodiments of the present invention. The B2 generator receives amalgamations of line overhead and frame capacity before the amalgamation is received by a section overhead inserter 914. The section overhead inserter 914 receives some input from a B1 generator 906 and passes a completed STS-48 frame to a scrambler 904. The output of the scrambler 904 is sent to the demultiplexer 608 (FIG. 6) on the transmission link 606 and is received by the B1 generator 906.

Figure 10:
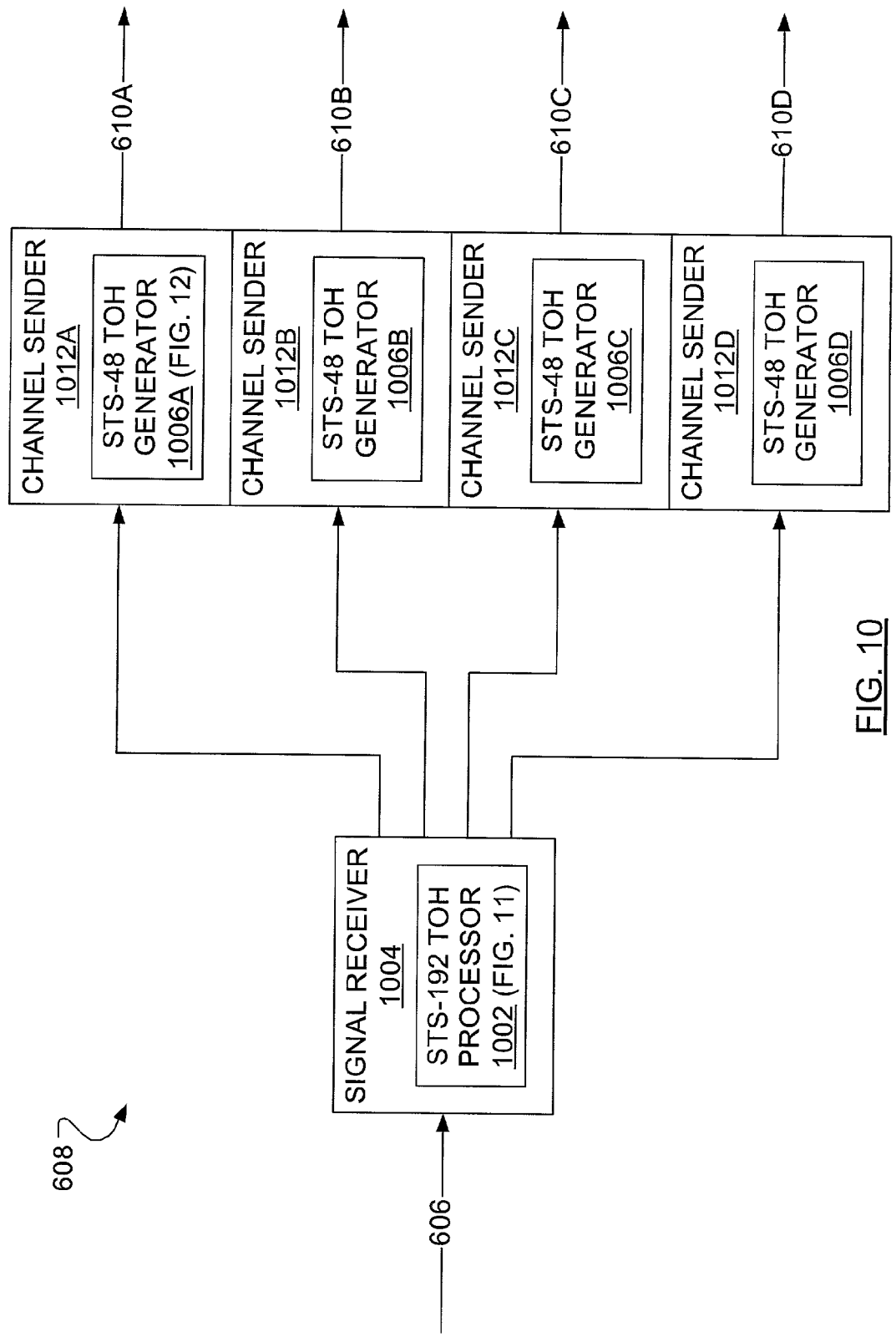
FIG. 10 illustrates a demultiplexer for use in the network portion of FIG. 6 in accordance with an aspect of the present invention.

The demultiplexer 608 is reproduced with some additional detail in FIG. 10. The transmission link 606 is received by a signal receiver 1004 that includes an STS-192 transport overhead processor 1002. The STS-192 transport overhead processor 1002 divides each incoming STS-192 frame into four STS-48 frames, which are then sent to an appropriate channel sender 1012A, 1012B, 1012C, 1012D (referred to collectively or individually as 1012) along with channel information for the transmission link 606, i.e., B1/B2 counts and SSM codes, and extracted channel information for each of the channels whose B1/B2 counts and SSM codes were included in the STS-192 frame. Each channel sender 1012 includes a respective STS-48 transport overhead generator 1006A, 1006B, 1006C, 1006D (referred to collectively or individually as 1006). Each channel sender 1012 receives STS-48 frames, adds transport overhead and send frames to the associated remote network element 618 (FIG. 6) on the associated output link 602.

Figure 11:
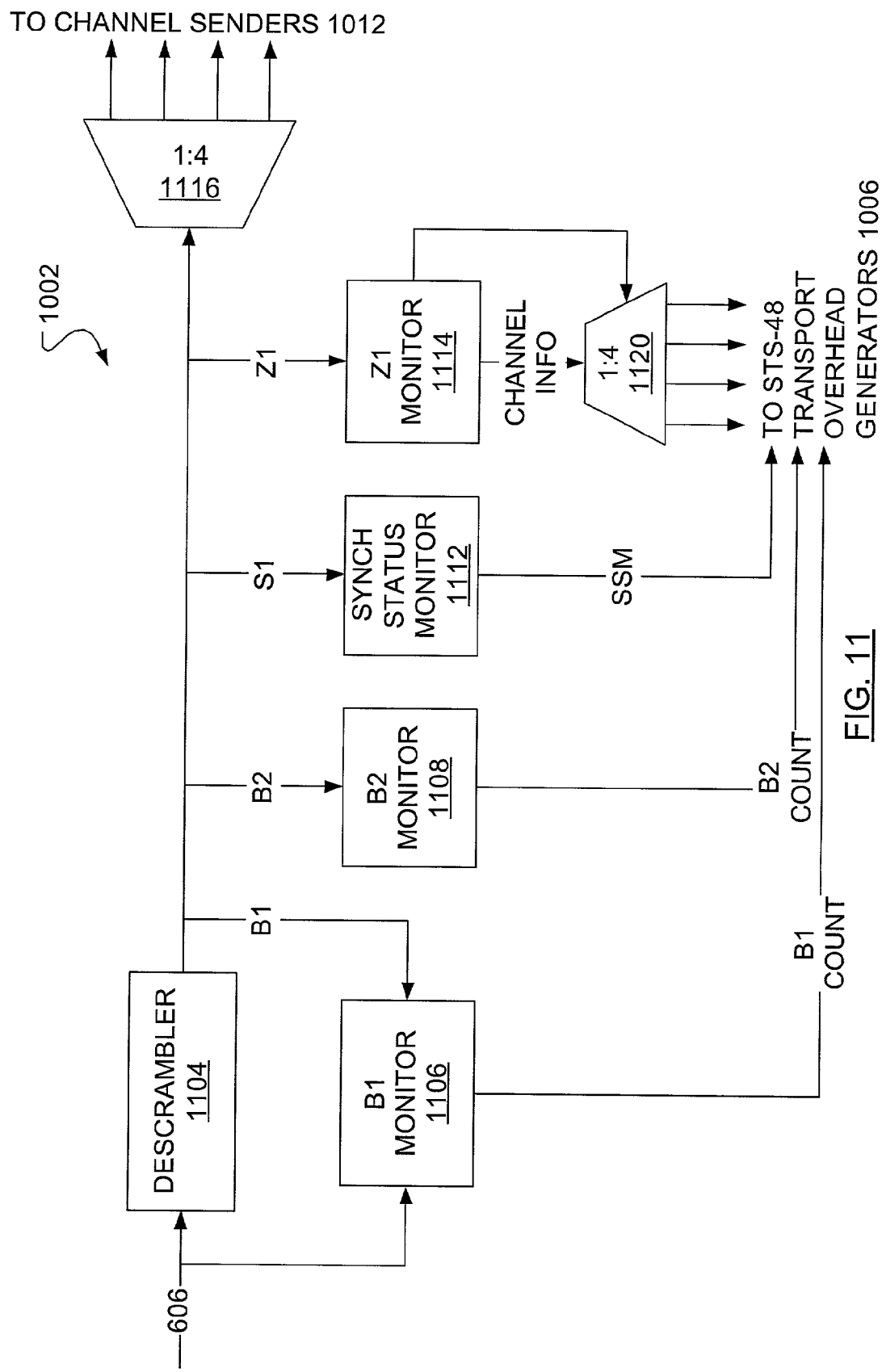
FIG. 11 illustrates a portion of a STS-192 transport overhead processor for use in the demultiplexer of FIG. 10 in accordance with an aspect of the present invention.

A generic STS-192 transport overhead processor 1002 is illustrated in FIG. 11. A descrambler 1104 is included in the TOH processor 1002 and receives the STS-192 frames on the transmission link 606. The STS-192 frames are passed by the descrambler 1104 to a signal 1:4 selector 1116, which appropriately routes STS-48 frames to the respective channel sender 1012. The TOH processor 1002 also includes a B1 monitor 1106 that receives frames both before and after descrambling and outputs a B1 count. Similarly, a B2 monitor 1108 receives frames and output a B2 count. Meanwhile, a synch status monitor 1112 extracts S1 bytes from received frames and outputs SSM codes. Further, a Z1 monitor 1114 extracts the channel-specific channel information included in the STS-192 frame. Each of the monitors 1106, 1108, 1112 passes output to the STS-48 transport overhead generators 1006. A Z1 1:4 selector 1120 is used to direct the channel-specific channel information, extracted by the Z1 monitor 1114, to a specific STS-48 transport overhead generator 1006. As will be apparent to a person skilled in the art, several other monitors examine received frames for specific overhead bytes; these other monitors are omitted for clarity.

Figure 12:
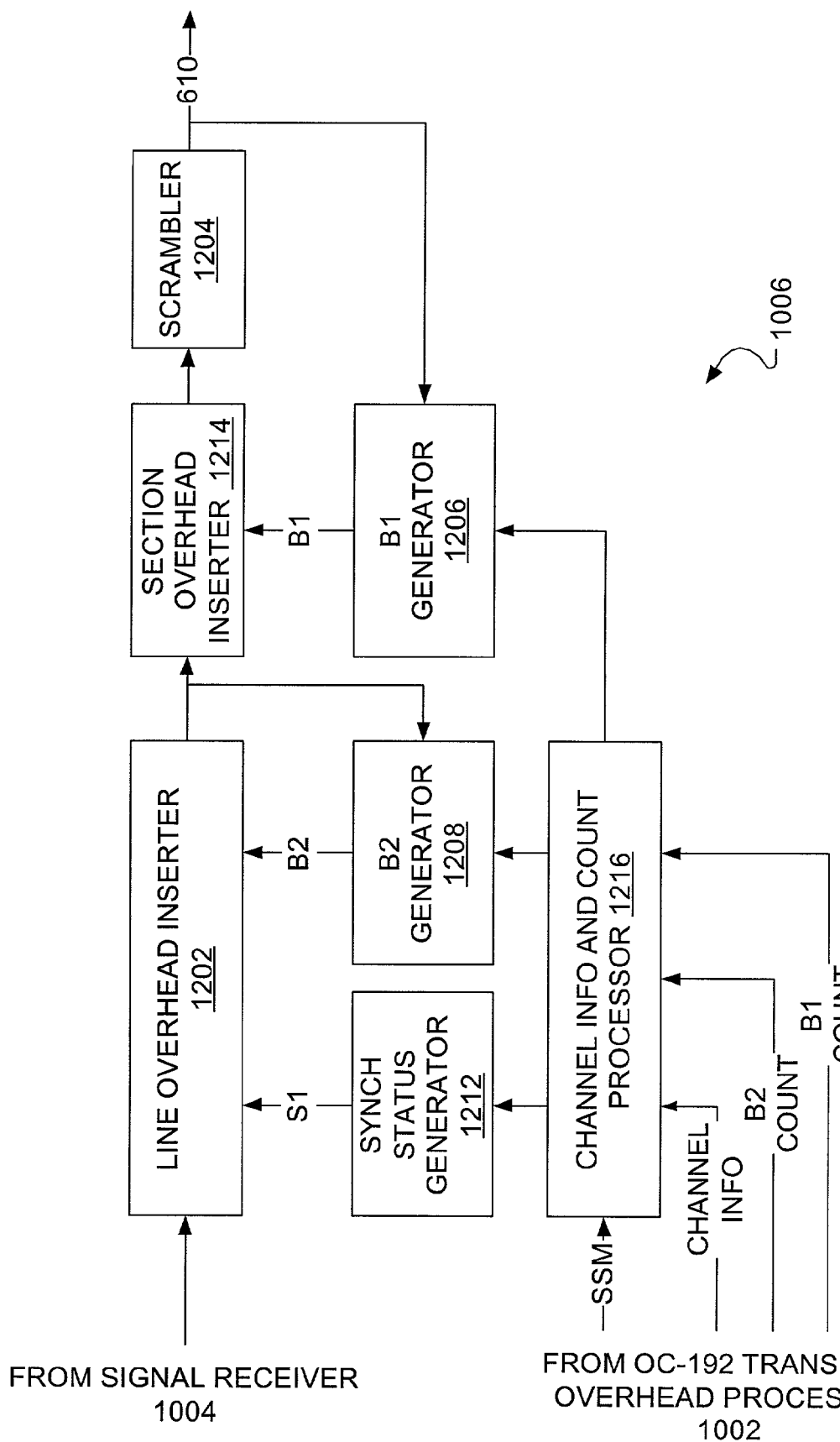
FIG. 12 illustrates a portion of a STS-48 transport overhead generator for use in the demultiplexer of FIG. 10 in accordance with an aspect of the present invention.

A generic STS-48 transport overhead generator 1006 is presented in detail in FIG. 12. A line overhead inserter 1202 receives STS-48 frame input from the signal receiver 1004. Input is also received at the line overhead inserter 1202 from a synch status generator 1212 and a B2 generator 1208. As will be apparent to a person skilled in the art, the line overhead inserter 1202 receives input from several other generators of bytes in the line overhead; these other generators are omitted for clarity. The B2 generator 1208 receives amalgamations of line overhead and frame capacity before the amalgamation is received by a section overhead inserter 1214. The section overhead inserter 1214 receives some input from a B1 generator 1206 and passes a completed STS-48 frame to a scrambler 1204. The output of the scrambler 1204 is sent to the appropriate remote network element 618 (FIG. 6) on the appropriate output link 610 and is received by the B1 generator 1206. Each of the generators 1206, 1208, 1212 receive input from a channel information and count processor 1216 that formulates that input based on STS-192 channel information and channel-specific STS-48 channel information received from the STS-192 TOH overhead processor 1002. At the channel information and count processor 1216, as will be detailed hereinafter, a fourth of the STS-192 B2 count is added to each received channel-specific B2 count, to a maximum sum of 384 per STS-48 frame. Similarly, the channel information and count processor 1216 adds a fourth of the STS-192 B1 count to the received channel-specific B1 count, to a maximum sum of eight per STS-48 frame.

In overview, the STS-192 frame that is transmitted on the OC-192 transmission link 606 is made up of 192 STS-1 frames that may be considered as numbered 1 through 192. As will be apparent to a person skilled in the art, the transport overhead of STS-1 frame number 1 includes the section overhead and line overhead for the STS-192 frame. While most of the line overhead of STS-1 frame number 1 relates to STS-1 frame number 1, the S1 byte relates to the SSM code for the combiner 604. It is herein proposed that the Z1 byte in STS-1 frame numbers 49, 97 and 145 of the STS-192 frame be used to carry the B1 and B2 counts and the SSM code received in each of the four STS-48 frames that are being combined to arrive at the STS-192 frame. The Z1 byte in STS-1 frame numbers 49, 97 and 145 of the STS-192 frame corresponds to the location of the S1 byte for STS-48 frames from local network element B 612B, local network element C 612C and local network element D 612D.

Use of the Z1 byte in STS-1 frame numbers 49, 97 and 145 of the STS-192 frame to transport information about each of the four channels provides 24 bits every STS-192 frame. Conveniently, due to this number of bits provided and the amount of information to be transferred per channel, the information about a particular channel is transferred every fourth STS-192 frame. The maximum B1 count for each STS-48 frame is eight, however, if the B1 count is only transferred once every fourth frame, the maximum B1 count for four frames is 32 and the minimum is zero. This range of potential values requires six bits for representation. The maximum B2 count for each STS-48 frame is 384 (eight per STS-1 frames, 48 STS-1 frames), however, if the B2 count is only transferred once every fourth frame, the maximum B2 count for four frames is 1536 and the minimum is zero. This range of potential values requires 11 bits for representation. Four bits are required to transport the SSM code for a given channel. Finally, two bits are required to identify the particular channel to which the transferred channel information relates. Therefore, 23 of 24 available bits are used. Given the line rate of the OC-192 transmission link 606, with channel information transferred every fourth STS-192 frame, information about each channel is received with only a 0.5 millisecond delay.

Figure 5:
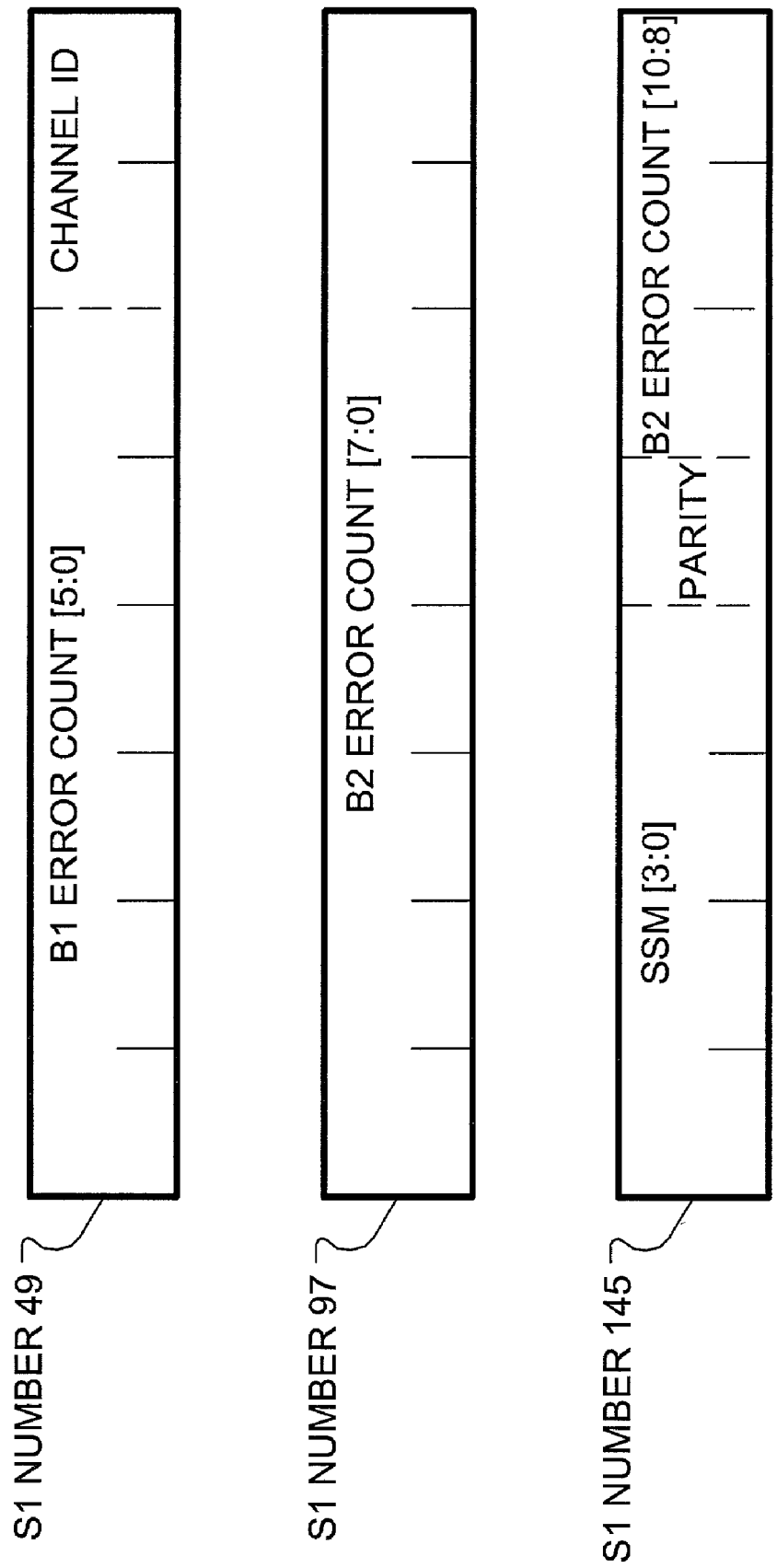
FIG. 5 illustrates a placement of bits in specific S1 bytes of an STS-192 frame in accordance with an aspect of the present invention.

A suggested placement of bits in Z1 of STS-1 frames number 49, number 97 and number 145 is presented in FIG. 5. A six-bit-long bit pattern representing the B1 count is placed in Z1 of STS-1 frame number 49 along with a two-bit-long bit pattern for channel identification. All eight bits of Z1 of STS-1 frame number 97 are used to hold a bit pattern of the least significant eight bits of the 11 bits that make up the B2 count. The remaining three bits of the B2 count are a three-bit-long bit pattern placed in Z1 of STS-1 frame number 145 along with four-bit-long bit pattern that is the SSM code. STS-1 frame number 145 also includes an even parity bit for use with the 11 bits that make up the B2 count. The even parity bit may allow the receiver of the STS-192 frame to determine whether B2 counts have been corrupted during transmission.

Figure 13:
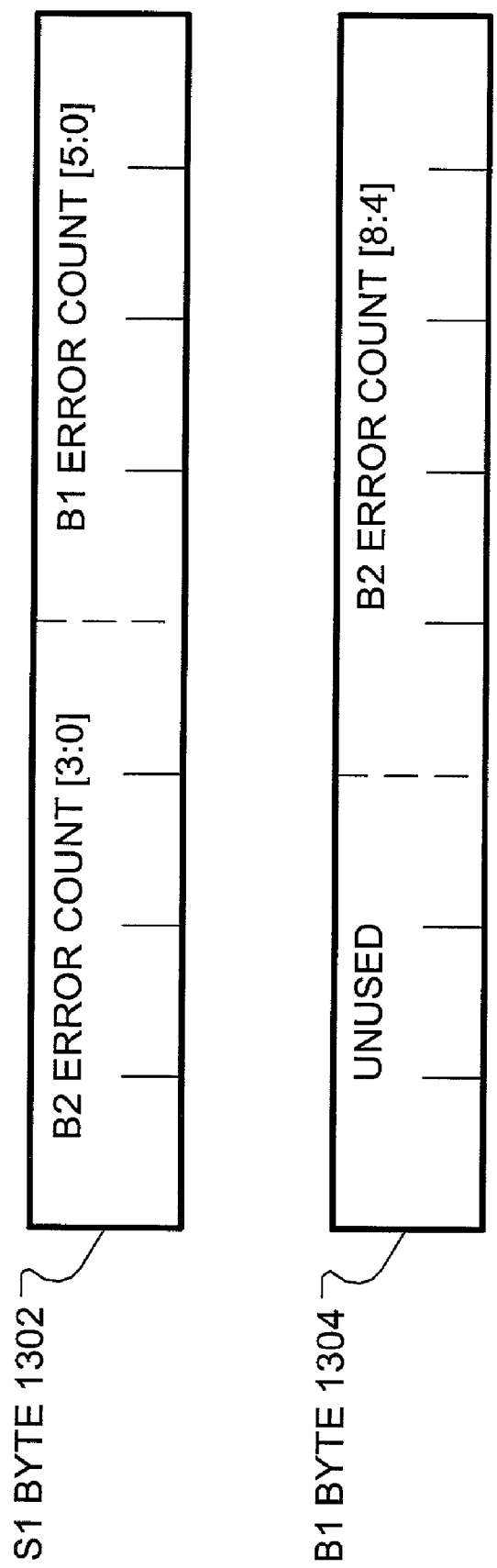
FIG. 13 illustrates a placement of bits in the S1 and B1 bytes of an STS-48 frame in accordance with an aspect of the present invention.

A suggested placement of bits in STS-48 frames passed from the STS-48 TOH processor 702 to the signal transmitter 704 is presented in FIG. 13. A four-bit-long bit pattern representing the B1 count is placed in the S1 byte 1302 of the STS-48 frame along with a four-bit-long bit pattern of the least significant four bits of the nine bits that make up the B2 count. Four bits are used for the B1 count because the maximum B1 count is eight while nine bits are used for the B2 count because the maximum B2 count is 384. The remaining five bits of the B2 count form a five-bit-long bit pattern in the B1 byte 1304 of the STS-48 frame. Three bits of the B1 byte are left unused.

In operation, with reference to FIG. 6, the combiner 604 receives STS-48 frames from each of the local network elements 612 on a corresponding OC-48 input link 602. The combiner 604 terminates the B1/B2 bytes and the SSM codes in each STS-48 frame and includes the terminated information in specific Z1 bytes of STS-192 frames outgoing on the OC-192 link 606. At the demultiplexer 608, the information included in the STS-192 frame is extracted and used when generating STS-48 frames for sending to remote network elements 618 on corresponding OC-48 output links 610.

Specific operation of parts of the combiner 604 may be reviewed in view of FIG. 7, FIG. 8 and FIG. 9. At the STS-48 TOH processor 702, the B1 monitor 806 extracts a B1 byte from a descrambled STS-48 frame and computes a B1 byte from the previous STS-48 frame. The B1 monitor 806 then compares the computed B1 byte to the extracted B1 byte and generates a B1 count of the errors in the previous STS-48 frame. The B1 count is then sent to the B1/B2 count accumulator 810. The B2 monitor 808 extracts a B2 byte from each STS-1 frame in a given descrambled STS-48 frame and computes a B2 byte for each STS-1 frame. The B2 monitor 806 then compares the B2 bytes computed for each STS-1 frame to the B2 bytes extracted from the subsequently received next corresponding STS-1 frame and generates a B2 count of the errors in the given STS-48 frame. The B2 count is then sent to the B1/B2 count accumulator 810. The B1 and B2 counts for four consecutive STS-48 frames are accumulated at the B1/B2 count accumulator 810 before an accumulated B1 count and an accumulated B2 count is output to the STS-192 TOH generator 706. (While the foregoing suggests that B1/B2 counts are computed for the previous frame at the time of comparison, in fact, more typically, B1/B2 counts are computed for the current frame and stored for comparison with extracted B1/B2 counts in the next frame.)

An SSM code is extracted from the line overhead of each descrambled STS-48 frame by the synch status monitor 812. SSM codes do not typically change very quickly, in part due to a hold off timer at the local network elements 612 ensuring a reduced likelihood of oscillating SSM codes. The extracted SSM code is passed to the SSM processor 816 where an interrupt may be generated responsive to a change in the value of the SSM code. This interrupt may be reset once the value of the SSM code has been read out by the SSM processor 816 to the Z1 generator 916 (FIG. 9). Consequently, it is the most recent SSM code from a given local network element 612 that is sent in the corresponding channel information that is included in the line overhead, as discussed hereinafter.

At the transport overhead generator 706 in FIG. 9, the B1/B2 counts and SSM codes are received by the Z1 generator 916. These values (counts and codes) are passed to the line overhead inserter 902 for inclusion in the line overhead with placement such as that according to the placement indicated in FIG. 5. These values may be transferred elsewhere in the transport overhead of the STS-192 frame so that the values may be recreated at the far end. However, the transfer should meet some criteria. For instance, an appropriate B1 and B2 count-transfer mechanism should not affect transparency of any other transport overhead bytes.

Specific operation of parts of the demultiplexer 608 may be reviewed in view of FIG. 10, FIG. 11 and FIG. 12. The B1 monitor 1106 of the STS-192 TOH processor 1002 receives scrambled frames and extracts B1 bytes from descrambled frames to generate B1 counts in a conventional manner. The B2 monitor also operates in a conventional manner on the received and descrambled STS-192 frames to generate B2 counts based on analysis of all of the STS-1 frames contained in the STS-192 frame. These B1 and B2 counts are then sent to all of the STS-48 transport overhead generators 1006. The synch status monitor 1112 extracts the SSM codes from each descrambled STS-192 frame and sends the code to all of the STS-48 transport overhead generators 1006. Unconventionally, the Z1 monitor extracts channel information from the Z1 byte in STS-1 frame numbers 49, 97 and 145 of the received and descrambled STS-192 frame. The Z1 monitor 1114 determines the appropriate channel sender 1012 to which to send a given set of channel information from the two bits for channel identification included in the Z1 byte of STS-1 frame number 49 (see FIG. 5). The given set of channel information is then sent by the Z1 monitor 1114 to the STS-48 transport overhead generator 1006 of the appropriate channel sender 1012 as directed by the Z1 1:4 selector 1120.

At each STS-48 transport overhead generator 1006, a generic one of which is illustrated in FIG. 12, the STS-192 frame B1 and B2 counts and SSM codes are received, along with STS-48 channel-specific channel information, from the signal receiver 1012 by the channel information and count processor 1216.

The channel information and count processor 1216 may pass both the received channel-specific SSM code and the STS-192 SSM code to the synch status generator 1212. In one embodiment of the present invention, the synch status generator 1212 passes the received channel-specific SSM codes to the line overhead inserter 1202. In another embodiment of the present invention, the synch status generator 1212 selects the lower of the two SSM codes for passing to the line overhead inserter 1202.

The channel information and count processor 1216 adds a fourth of the STS-192 B2 count to the received channel-specific B2 count and passes the result as a "B2 sum" to the B2 generator 1208. The maximum B2 sum is 384. At the B2 generator 1208, a B2 byte is generated in a conventional manner for each STS-1 frame based on the amalgamated line overhead and frame capacity of the previous STS-1 frame before scrambling. The B2 sum received from the channel information and count processor 1216 is divided by 48 to give a number of B2 errors per STS-1 frame. Each generated B2 byte is then artificially altered to represent the number of B2 errors per STS-1 frame. This artificial B2 byte is used for four consecutive STS-48 frames (192 consecutive STS-1 frames) on a given channel, i.e., until the next channel-specific B2 count is received.

The channel information and count processor 1216 adds a fourth of the STS-192 B1 count to the received channel-specific B1 count and passes the result as a "B1 sum" to the B1 generator 1206. The maximum B1 sum is eight. At the B1 generator 1206, a B1 byte is generated in a conventional manner for each STS-48 frame based on the previous STS-48 frame after scrambling. The B1 sum received from the channel information and count processor 1216 is then used to artificially alter the B1 byte to represent the number of B1 errors per STS-48 frame. This artificial B1 byte is used for four consecutive STS-48 frames on a given channel, i.e., until the next channel-specific B1 count is received.

At the remote network element 618 then, an STS-48 frame is received conventionally. In particular, a B1 byte is calculated for a given received STS-48 frame and compared to a B1 byte extracted from the subsequent STS-48 frame. The extracted B1 byte is compared to the calculated B1 byte to result in a B1 error count, which is then reported by the remote network element 618 to the network management system. For each STS-1 frame in the STS-48 frame, a B2 byte is calculated and compared to a B2 byte extracted from the following STS-1 frame. A B2 count, the result of this comparison, is then reported by the remote network element 618 to the network management system. As SSM codes are generally used by SONET equipment to determine the quality of a timing reference. The received SSM code allows the remote network element 618 to compare the local network element 612 to which the SSM code relates to any another network element as a timing source and therefore select the more accurate timing source.

Hence, the fact that the network portion 600 includes the combiner 604 and the demultiplexer 608 is transparent to the remote network element 618. In effect, the combination of the OC-48 input link 602, the combiner 604, the OC-192 transmission link 606, the demultiplexer 608 and the OC-48 output link 610 appears to the remote network element 618 as a single OC-48 link.

Since the SSM code is regenerated at the far end, the choice of Z1 as a carrier of the channel information will not affect transparency. Bits 1–4 of the S1 byte in each STS-48 frame are presently undefined. If these bits are eventually used, the described embodiment of the present invention will not be transparent. However, those skilled in the art will recognize appropriate modifications to retain transparency in such an eventuality.

For example, another transport overhead byte, such as the B1 byte, may be used in STS-1 frame numbers 49, 97 and 145 of the STS-192 frame to carry the channel-specific channel information.

As will be apparent to a person skilled in the art, the present invention may find use in situations other than the presented application of the combining of four STS-48 frames into a single STS-192 frame. For instance, the channel information may be transferred in unused bytes while combining four STS-3 frames into a single STS-12 frame without departing from the scope of the invention. Furthermore, the number of input and output channels may be other than four.

As will be further apparent to a person skilled in the art, although the present invention is illustrated implemented primarily in hardware, the invention could be implemented in software.

Although the application of the invention is illustrated in the SONET realm, it should be apparent to a person skilled in the art that the invention applies equally in the SDH realm.

Other modifications will be apparent to those skilled in the art and, therefore, the invention is defined in the claims.

We claim:

1. A method of generating transport overhead for a high-speed frame of data in a synchronous optical communications network, said high-speed frame of data including a plurality of low-speed frames of data, said method comprising:
   receiving an indication of error count associated with one of said low-speed frames of data, said indication of error count including a B1 count and a B2 count;
   determining an error count bit pattern representative of said indication of error count;
   receiving an indication of synchronization status associated with one of said low-speed frames of data; determining a synchronization status bit pattern representative of said indication of synchronization status; and
   inserting said error count bit pattern and said synchronization status bit pattern into a transport overhead for said high-speed frame, where said error count bit pattern and said synchronization status bit pattern are inserted in at least one portion of said transport overhead and where said at least one portion is unused according to said standard that defines said high-speed frame.

2. The method of claim 1 further comprising inserting a parity bit for said error count bit pattern into said transport overhead, where said parity bit is inserted in another portion of said transport overhead where said another portion is unused according to said standard that defines said high-speed frame.

3. A method of generating transport overhead for a high-speed frame of data in a synchronous optical communications network, said high-speed frame of data including a plurality of low-speed frames of data, said method comprising:
   receiving an indication of error count associated with one of said low-speed frames of data, said indication of error count including a B1 count and a B2 count;
   determining an error count bit pattern representative of said indication of error count;
   associating a channel identifier with each of said plurality of low-speed frames of data; determining a channel identification bit pattern representative of said channel identifier; and
   inserting said error count bit pattern and said channel identification bit pattern into said transport overhead for said high-speed frame, where said error count bit pattern and said channel identification bit pattern are inserted in at least one portion of said transport overhead and where said at least one portion is unused according to said standard that defines said high-speed frame.

4. A method of generating transport overhead for a low-speed frame of data in a synchronous optical communications network, said low-speed frame of data received as part of a high-speed frame of data, said method comprising:
   receiving at least one error count quantity associated with said low-speed frame of data, where said at least one error count quantity is determined from an error count bit pattern including a B1 count and a B2 count extracted from said high-speed frame of data;
   determining a standard error monitoring set of bits based on a previous low-speed frame of data;
   creating an altered error monitoring set of bits that differs from said standard error monitoring set of bits in a number of bit positions equivalent to said error count quantity;
   inserting said altered error monitoring set of bits into a transport overhead for said frame, where said altered error monitoring set of bits is inserted in a location normally occupied by said error monitoring set of bits according to a standard that defines said frame, wherein said standard that defines said high-speed frame is the SONET standard;
   receiving an indication of a quantity of errors associated with said high-speed frame; and
   where said determining said error count quantity is further based on said indication of said quantity of errors associated with said high-speed frame.

5. A method of de-multiplexing a plurality of low-speed frames of data from a high-speed frame of data, said method comprising:
   receiving said high-speed frame;
   extracting an error count bit pattern including a B1 count and a B2 count from said high-speed frame;
   determining a quantity of errors associated with said high-speed frame;
   determining an error count quantity based on said error count bit pattern, where said determining said error count quantity is further based on said quantity of errors associated with said high-speed frame;
   determining a standard error monitoring set of bits for a low-speed frame;
   creating an altered error monitoring set of bits that differs from said standard error monitoring set of bits in a number of bit positions equivalent to said error count quantity; and
   inserting said altered error monitoring set of bits into a transport overhead for said low-speed frame, where said altered error monitoring set of bits is inserted in a location normally occupied by said standard error monitoring set of bits according to a standard that defines said low-speed frame, wherein said standard that defines said high-speed frame is the SONET standard.

* * * * *